United States Patent
Ishii et al.

(10) Patent No.: US 11,414,153 B2
(45) Date of Patent: Aug. 16, 2022

(54) STRADDLE-TYPE VEHICLE

(71) Applicant: KAWASAKI JUKOGYO KABUSHIKI KAISHA, Kobe (JP)

(72) Inventors: Hiroshi Ishii, Kobe (JP); Kohei Akita, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 307 days.

(21) Appl. No.: 16/671,555

(22) Filed: Nov. 1, 2019

(65) Prior Publication Data

US 2020/0140031 A1 May 7, 2020

(30) Foreign Application Priority Data

Nov. 2, 2018 (JP) .............................. JP2018-207445

(51) Int. Cl.
| | | |
|---|---|---|
| B62K 11/04 | (2006.01) | |
| B62J 35/00 | (2006.01) | |
| B62K 19/40 | (2006.01) | |

(52) U.S. Cl.
CPC .............. *B62K 11/04* (2013.01); *B62J 35/00* (2013.01); *B62K 19/40* (2013.01); *F01N 2340/04* (2013.01); *F01N 2590/04* (2013.01)

(58) Field of Classification Search
CPC .......... B62K 11/04; B62K 19/40; B62J 35/00; F01N 2340/04; F01N 2590/04
See application file for complete search history.

(56) References Cited

U.S. PATENT DOCUMENTS

| | | | | |
|---|---|---|---|---|
| 6,637,398 B2* | 10/2003 | Suzuki | .................... | F02B 75/22 |
| | | | | 123/195 R |
| 7,350,881 B2* | 4/2008 | Asahi | .................... | B60T 8/3685 |
| | | | | 180/232 |
| 7,399,029 B2 | 7/2008 | Takeshita | | |
| 7,806,215 B2 | 10/2010 | Codere et al. | | |
| 7,942,484 B2* | 5/2011 | Yamakura | .............. | B62K 19/38 |
| | | | | 303/137 |
| 8,579,064 B2* | 11/2013 | Oohashi | ................. | B62K 11/04 |
| | | | | 180/219 |
| 8,887,859 B2* | 11/2014 | Matsushima | .......... | B62K 19/38 |
| | | | | 180/312 |
| 9,242,599 B2* | 1/2016 | Shimizu | ................. | B60Q 5/008 |
| 2007/0089923 A1* | 4/2007 | Oohashi | ................... | B62J 45/42 |
| | | | | 180/229 |
| 2018/0272857 A1 | 9/2018 | Matsushima | | |

FOREIGN PATENT DOCUMENTS

| | | |
|---|---|---|
| CN | 108657344 | 10/2018 |
| EP | 3 135 572 | 3/2017 |

(Continued)

*Primary Examiner* — Tony H Winner
*Assistant Examiner* — Michael R Stabley
(74) *Attorney, Agent, or Firm* — Wenderoth, Lind & Ponack, L.L.P.

(57) ABSTRACT

A straddle-type vehicle includes a driver seat on which a driver rides, a cylinder head of an engine arranged in a region in front of and below the driver seat, an exhaust pipe that is connected to an exhaust port formed on a front surface of the cylinder head and exhausts exhaust of the engine, and a control unit that is arranged in an engine front space formed in front of the cylinder head, above the exhaust pipe, and below an upper end surface of the engine and controls the straddle-type vehicle.

10 Claims, 8 Drawing Sheets

(56) References Cited

FOREIGN PATENT DOCUMENTS

| JP | 2012-210849 | 11/2012 |
| JP | 2013-71586 | 4/2013 |
| JP | 2016-182838 | 10/2016 |
| JP | 2017-171084 | 9/2017 |

* cited by examiner

STRADDLE-TYPE VEHICLE

BACKGROUND OF THE INVENTION

1. Field of the Invention

The present invention relates to a straddle-type vehicle.

2. Description of the Related Art

Conventionally, as disclosed in JP 2017-171084 A, a control unit that controls an operation of a motorcycle, such as an electronic control unit (ECU) and an anti-lock braking system (ABS) unit, is arranged below a seat of the motorcycle.

SUMMARY OF THE INVENTION

Considering that a size of the control unit has been increasing in recent years, it is assumed that the control unit may not be arranged in an arrangement space below the seat. Further, regardless of the size of the control unit, other mounted objects are arranged and the like under the seat, so that it is desired to improve a degree of freedom of arrangement of the control unit.

Therefore, an object of the present invention is to provide a straddle-type vehicle in which a control unit can be arranged more easily than in the prior art by preparing an arrangement space for the control unit separately from a space under the seat.

A first aspect of the present invention is a straddle-type vehicle including: a driver seat on which a driver rides; a cylinder head of an engine arranged in a region in front of and below the driver seat; an exhaust pipe that is connected to an exhaust port formed on a front surface of the cylinder head, and exhausts exhaust of the engine; and a control unit that is arranged in an engine front space formed in front of the cylinder head, above the exhaust pipe, and below an upper end surface of the engine, and controls the straddle-type vehicle.

According to the above configuration, the control unit is arranged in the engine front space formed above the exhaust pipe. As described above, the control unit can be arranged using a space prepared for connecting the exhaust pipe, and accordingly, an installation space of the control unit can be easily secured with the limited arrangement space.

The first aspect preferably further includes the following configurations.

(1) The first aspect further includes a unit cover that prevents hot air from the engine and the exhaust pipe from reaching the control unit.

(2) In the configuration (1), the unit cover includes a rear wall that partitions the cylinder head and a rear surface of the control unit from each other in a front-rear direction, a lower wall that partitions the exhaust pipe and a lower surface of the control unit from each other in a vertical direction, and a pair of side walls that respectively cover both side surfaces in a vehicle width direction of the control unit.

(3) In the configuration (1) or (2), the unit cover is provided with an upper gap communicating an internal space in which the control unit is arranged and an external space arranged above the internal space with each other, and a lower gap arranged below the upper gap and communicating the internal space and an external space with each other.

(4) The exhaust pipe is provided with a widened part directed outward in the vehicle width direction as the exhaust pipe runs forward from the exhaust port.

(5) In a front view of a vehicle body, the control unit is arranged at a position shifted in the vehicle width direction with respect to the exhaust pipe.

(6) The engine and the exhaust pipe are entirely exposed in a side view.

(7) The first aspect further includes a fuel tank arranged in front of and above the driver seat, and a vehicle body frame having a head pipe supporting a handle, and down frames connected to the head pipe and extending downward from the fuel tank, in which the control unit is arranged below the fuel tank and behind the down frames.

(8) In the configuration (7), in the front view of the vehicle body, the down frames are provided with a front wall member that covers at least a part of a front surface of the control unit.

(9) In the configuration (8), the down frames extend downward as a pair with a space provided in the vehicle width direction, the front wall member connects the down frames in the vehicle width direction and supports the control unit, and a support member that supports the control unit on the down frames includes a support part that supports another electrical component arranged between the pair of down frames.

According to the configuration (1), the unit cover can suppress the influence of exhaust heat of the engine on the control unit and prevent a temperature rise of the control unit to allow the control unit to be arranged close to the engine and the exhaust pipe, and therefore, the installation space can be secured more easily.

According to the configuration (2), each wall can form an air layer between the cylinder head and the exhaust pipe, and the control unit. As a result, the temperature rise of the surrounding environment of the control unit due to the exhaust heat can be further prevented to allow the control unit to be arranged close to the engine and the exhaust pipe, and accordingly, the installation space can be secured more easily.

According to the configuration (3), due to the upper gap and the lower gap, the air between the control unit and the unit cover can more easily form a flow that flows upward, and the hot air in the internal space of the unit cover can be discharged. Accordingly, the temperature rise of the control unit can be further suppressed.

According to the configuration (4), the exhaust pipe is separated outward in the vehicle width direction with respect to the control unit arranged in front of the exhaust port. As a result, the influence of the hot air of the exhaust pipe on the control unit can be suppressed.

According to the configuration (5), the exhaust pipe and the control unit can be easily shifted from each other in the vehicle width direction, and accordingly, the influence of the exhaust heat of the exhaust pipe on the control unit can be suppressed.

According to the configuration (6), the influence of the exhaust heat on the control unit can be further suppressed without the exhaust heat being stagnant.

According to the configuration (7), the control unit is arranged in a region surrounded by the cylinder head, the fuel tank, the down frame, and the exhaust pipe. As a result, the control unit is surrounded by the members with relatively high rigidity over the front, rear, upper, and lower sides, and accordingly, the protective effect of the control unit can be enhanced.

According to the configuration (8), scattered matters from the front can be prevented from colliding with the control unit and a cable connection part of the control unit, and accordingly, the protective effect of the control unit can be enhanced.

According to the configuration (9), the support member of the control unit and the other electrical component can be made common, and accordingly, the number of components can be reduced. Further, the other electrical component can be expected to receive the protective effect provided by the down frames, by being arranged between the pair of down frames.

A second aspect of the present invention is a straddle-type vehicle including: a driver seat on which a driver rides; a fuel tank arranged in front of and above the driver seat; a cylinder head of an engine arranged in a region in front of the driver seat and below the fuel tank; and a control unit that is arranged in an engine front space formed in front of the cylinder head, behind the fuel tank, above a lower surface of the cylinder head, and below a lower surface of the fuel tank, and controls the straddle-type vehicle.

According to the above configuration, the control unit can be arranged using a space prepared for connecting the exhaust pipe, and accordingly, the arrangement space of the control unit can be easily secured with the limited arrangement space.

In summary, according to the present invention, a straddle-type vehicle in which a control unit can be easily arranged can be provided.

DETAILED DESCRIPTION OF THE INVENTION

Hereinafter, a motorcycle is described as a straddle-type vehicle according to an embodiment of the present invention with reference to the attached drawings. For convenience of description, a traveling direction of the motorcycle is referred to as a "front side" of the motorcycle and respective components, and left and right sides in a vehicle width direction when a rider riding on the motorcycle looks forward is referred to as "left and right sides" of the motorcycle and respective components.

Figure 1:
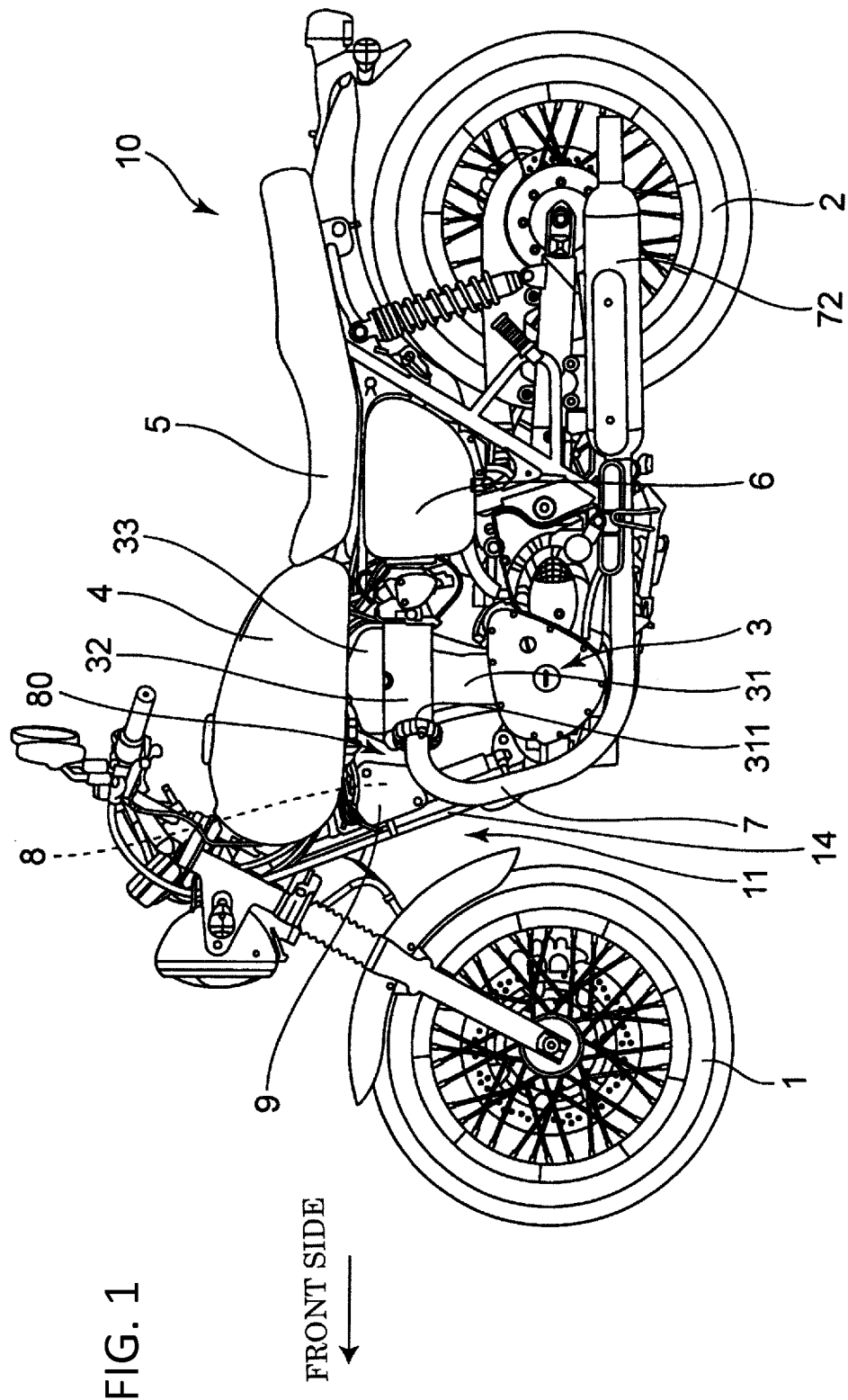
FIG. 1 is an overall side view of a motorcycle according to an embodiment of the present invention.

FIG. 1 is an overall side view of a motorcycle according to an embodiment of the present invention. As shown in FIG. 1, a motorcycle 10 is a naked type without a cowl. In the naked type, a periphery of an engine is exposed outside a vehicle body. Specifically, side surfaces of the engine in the vehicle width direction are exposed outward in the vehicle width direction, and an exhaust pipe is also exposed outward in the vehicle width direction. That is, in the side view, the side surfaces of the engine and the exhaust pipe are configured to be visible.

In the present embodiment, the motorcycle 10 includes an engine 3 between a front wheel 1 and a rear wheel 2. The engine 3 is supported by a vehicle body frame 11, and because the motorcycle 10 does not have a cowl, the engine 3 is exposed in the side view of the motorcycle 10.

Figure 2:
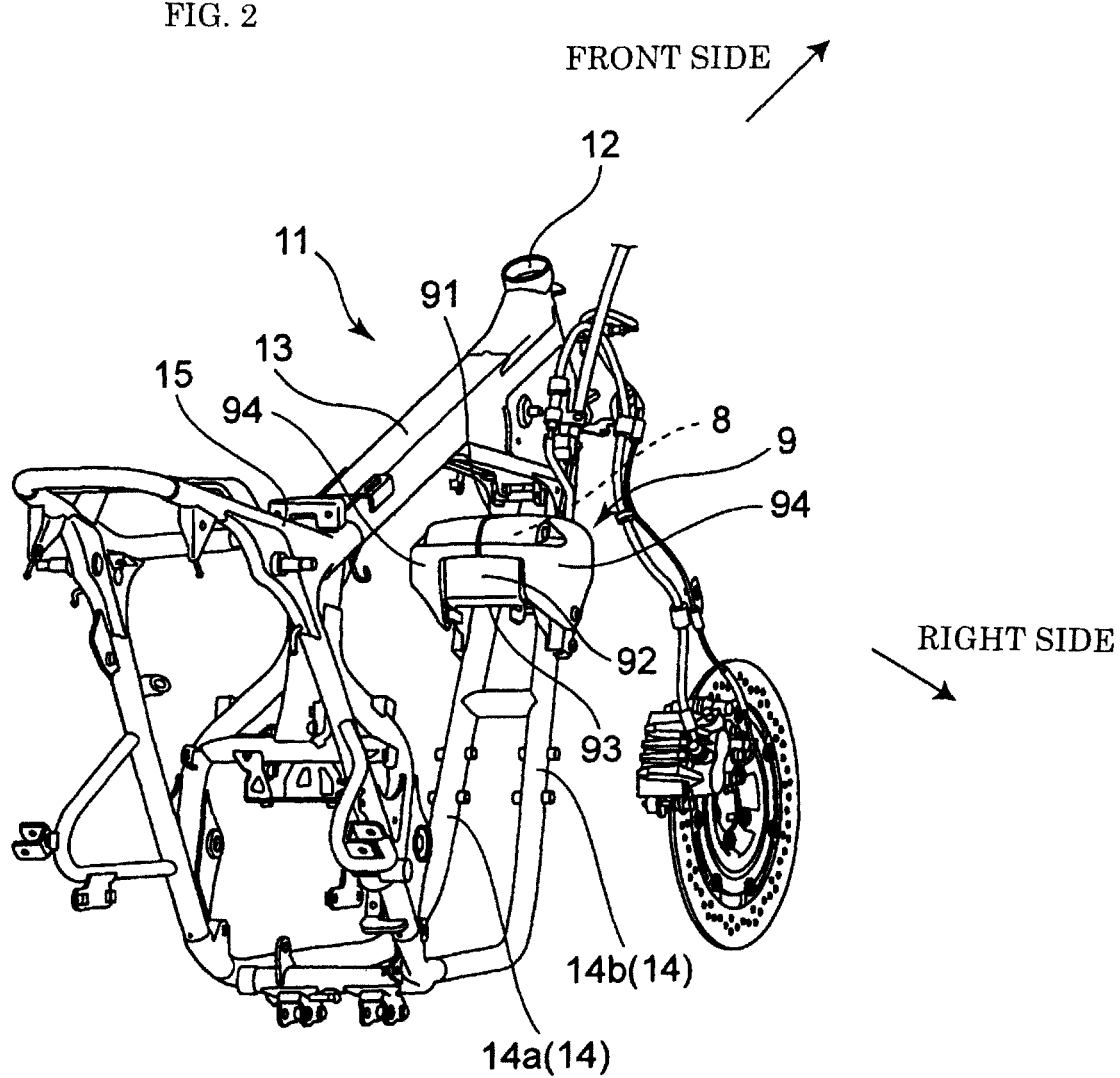
FIG. 2 is a rear perspective view of a vehicle body frame.

FIG. 2 is a rear perspective view of the vehicle body frame 11. As shown in FIG. 2, the vehicle body frame 11 includes a head pipe 12 that rotatably supports a steering shaft, a main frame 13 extending rearward and downward from the head pipe 12, and a pair of left and right down frames 14 branching from the head pipe 12 and extending downward and rearward from the head pipe 12.

The motorcycle 10 is configured to prevent an increase in the ambient temperature of the engine 3 by replacing the air around the engine 3 by the traveling wind. The engine 3 is an air-cooled engine in which fins for heat dissipation are formed on a cylinder head and a cylinder block, and is arranged below the main frame 13 and supported by the main frame 13 and the down frames 14.

A fuel tank 4 storing fuel supplied to the engine 3 is supported by the main frame 13. A driver seat 5 on which a driver rides is arranged behind the fuel tank 4, and the driver seat 5 is supported by a pair of left and right seat rails 15 branching from a rear end of the main frame 13 and extending rearward.

An air cleaner 6 for cleaning the intake air supplied to the engine 3 is arranged below the driver seat 5 and behind the engine 3.

Figure 3:
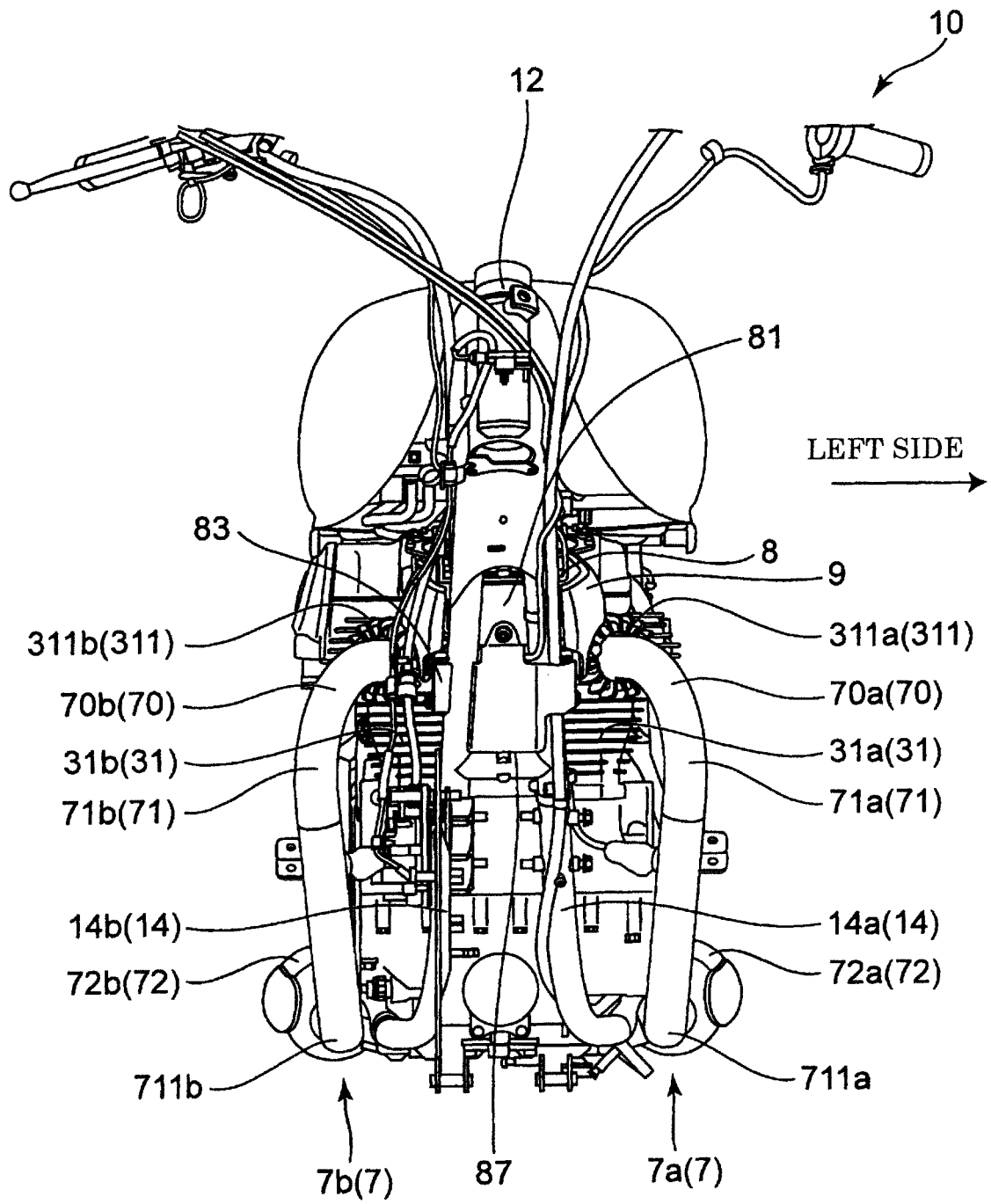
FIG. 3 is a front view of the motorcycle.

FIG. 3 is a front view of the motorcycle 10. As shown in FIG. 3, for example, in the present embodiment, the engine 3 has plural cylinders, specifically, two cylinders 31 (left cylinder 31a and right cylinder 31b). A moving direction of a piston of the engine 3 is substantially vertical, and the cylinders 31 extend substantially parallel to the vertical direction. Exhaust pipes 7 (left exhaust pipe 7a and right exhaust pipe 7b) are connected to each of exhaust ports of the two cylinders 31, respectively.

The left exhaust pipe 7a has a widened part 70a (70) extending outward in the vehicle width direction as the left exhaust pipe runs forward from an exhaust port 311a opening in a front wall of the left cylinder 31a, extends in a curved shape on the left side of the left down frame 14a toward a front left side and downward, is folded rearward at a front end part 71a (71) that overlaps with the left down frame 14a in the side view, and extends downward and rearward and reaches a lower end part 711a while slightly inclining inward in the vehicle width direction. The lower end part 711a of the left exhaust pipe 7a is located below the engine 3 in the side view, and the left exhaust pipe 7a extends rearward substantially horizontally from the lower end part 711a and reaches an exhaust muffler 72a.

The right exhaust pipe 7b is arranged symmetrically with the left exhaust pipe 7a, and has a widened part 70b (70) extending outward in the vehicle width direction as the right exhaust pipe runs forward from an exhaust port 311b opening in a front wall of the right cylinder 31b, extends in a curved shape on the right side of the right down frame 14b toward a front right side and downward, is folded rearward at a front end part 71b (71) that overlaps with the right down frame 14b in the side view, and extends downward and rearward and reaches a lower end part 711b while slightly inclining inward in the vehicle width direction. The lower end part 711b of the right exhaust pipe 7b is located below the engine 3 in the side view, and the right exhaust pipe 7b extends rearward substantially horizontally from the lower end part 711b and reaches the exhaust muffler 72b.

The motorcycle 10 is equipped with an ABS function and is provided with an ABS unit 8 that can control an amount of supply of a brake fluid. The ABS unit 8 supplies brake pressure to a brake caliper provided on the front wheel 1 and a brake caliper provided on the rear wheel 2, and is arranged at a position between the front wheel 1 and the rear wheel 2. The ABS unit 8 is a unit including a pump that pressurizes the brake fluid, a valve that adjusts the amount of supply of the brake fluid, and a control device that controls operations of the pump and the valve, and generates periodic changes in the brake pressure to prevent a wheel lock state.

The ABS unit 8 is arranged in an engine front space 80 having a shape of inverted trapezoidal in the side view, formed in front of the cylinder head 32 of the engine 3, above the exhaust pipe 7, and below an upper end surface of the engine 3. Further, the ABS unit 8 is arranged behind the down frames 14, and is arranged below the fuel tank 4 and above the front end part 71 of the exhaust pipe 7 extending from the exhaust port 311 of the engine 3. The ABS unit 8 is also arranged between the pair of left and right down frames 14 and supported by support members 83 on the down frames 14. Additionally, in the front view of the vehicle body, the down frames 14 are provided with a front wall member 81 that covers at least a part of a front surface of the ABS unit 8. The front wall member 81 connects the left and right down frames 14a and 14b in the vehicle width direction, and supports the ABS unit 8.

The ABS unit 8 is arranged behind the front end part 71 of the exhaust pipe 7 and a front end part of the fuel tank 4, and is located between both end parts in the vehicle width direction of the engine 3 and between both end parts in the vehicle width direction of the fuel tank 4. Additionally, in the front view of the vehicle body, the ABS unit 8 is arranged at a position shifted inward in the vehicle width direction with respect to the exhaust pipe 7. Further, the ABS unit 8 is arranged above the cylinder 31 of the engine 3.

The ABS unit 8 is arranged with a gap provided in front of the exhaust port 311, and an upper end of the ABS unit 8 is located above an upper end of the exhaust port 311, and a lower end of the ABS unit 8 is located below a lower end of a head cover 33. Further, the upper end of the ABS unit 8 is located above an upper end of the front wheel 1 so that the traveling wind can easily flow toward the ABS unit 8.

Figure 4:
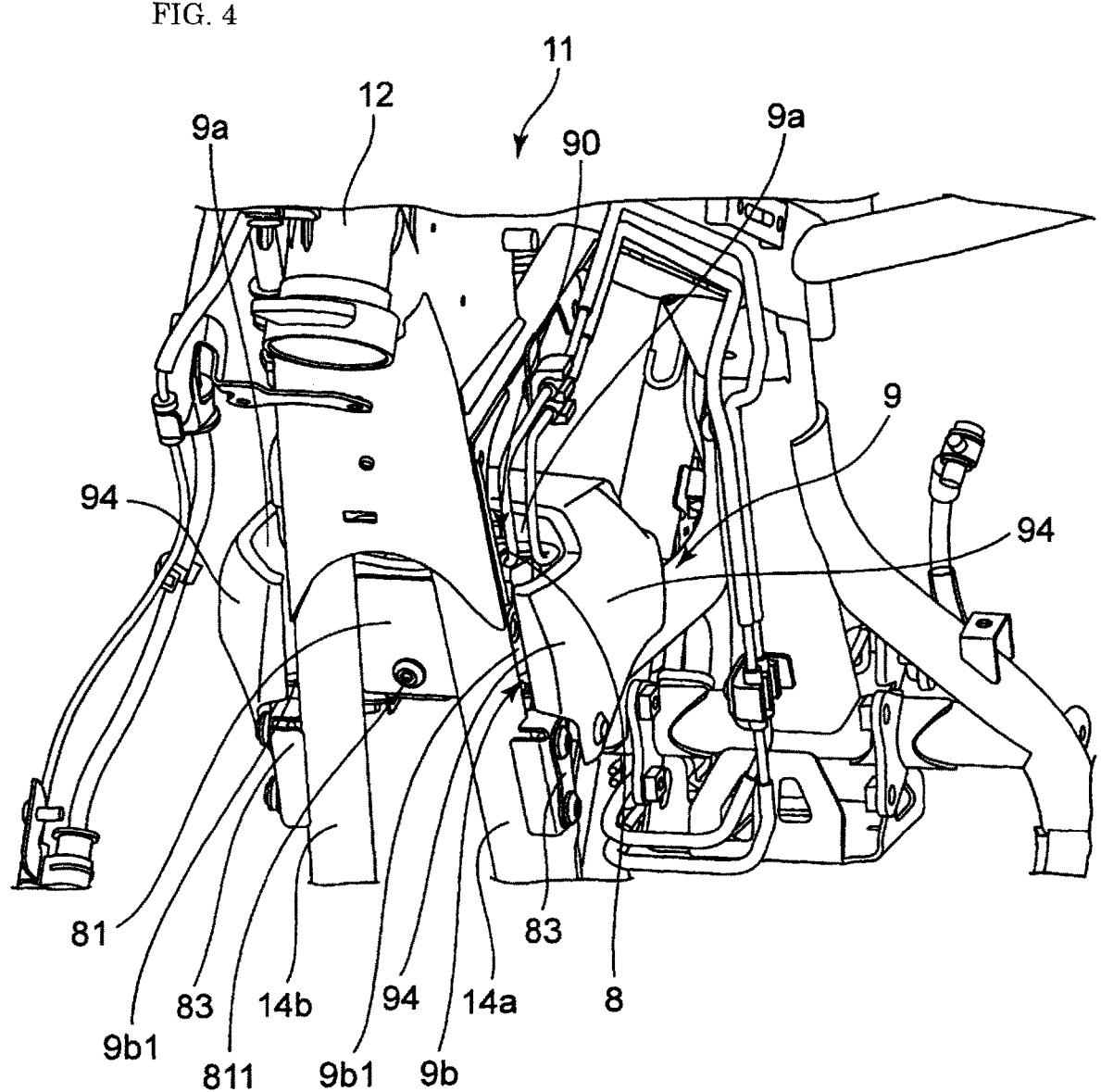
FIG. 4 is an enlarged front perspective view around an ABS unit.
Figure 5:
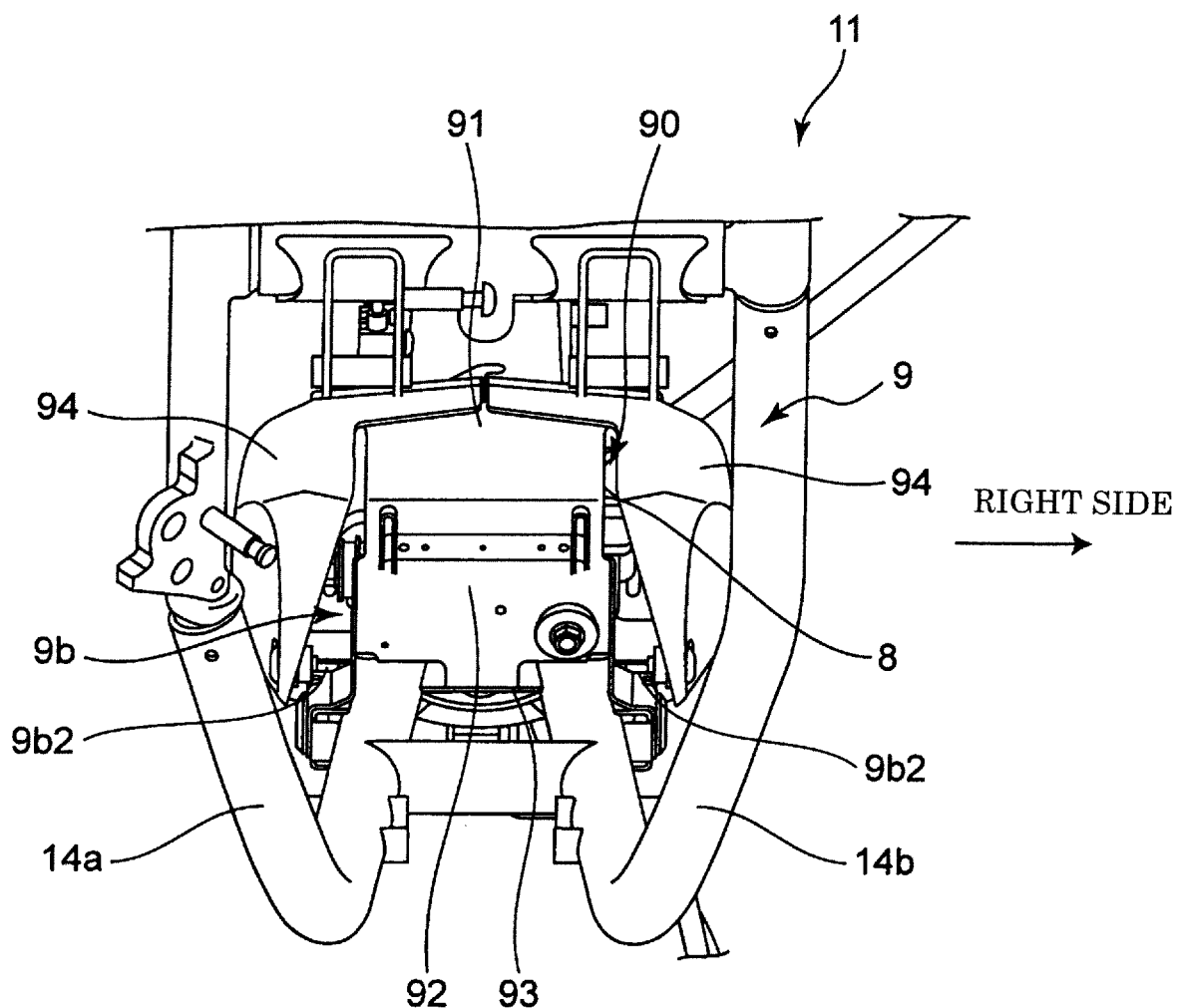
FIG. 5 is an enlarged rear view around the ABS unit.
Figure 6:
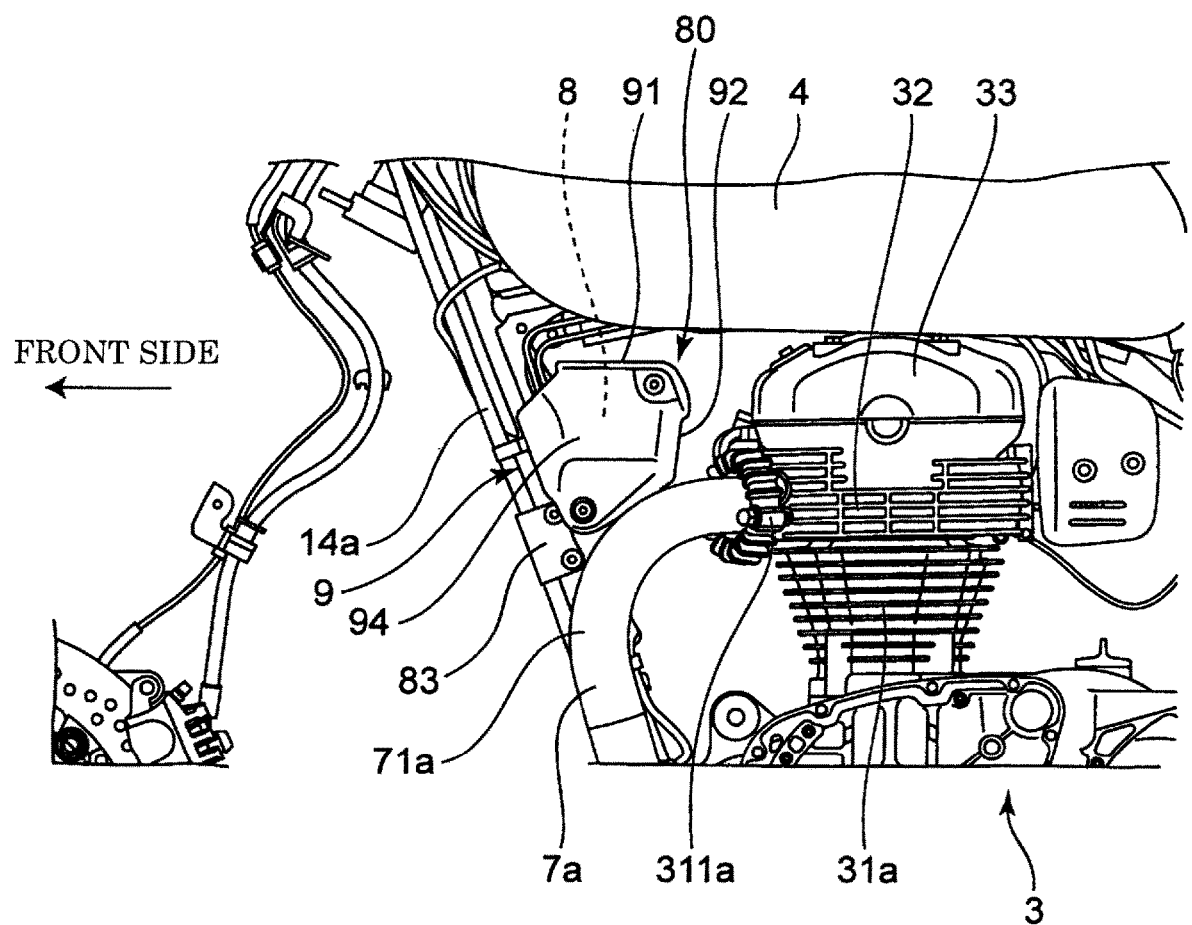
FIG. 6 is an enlarged left side view around the ABS unit.
Figure 7:
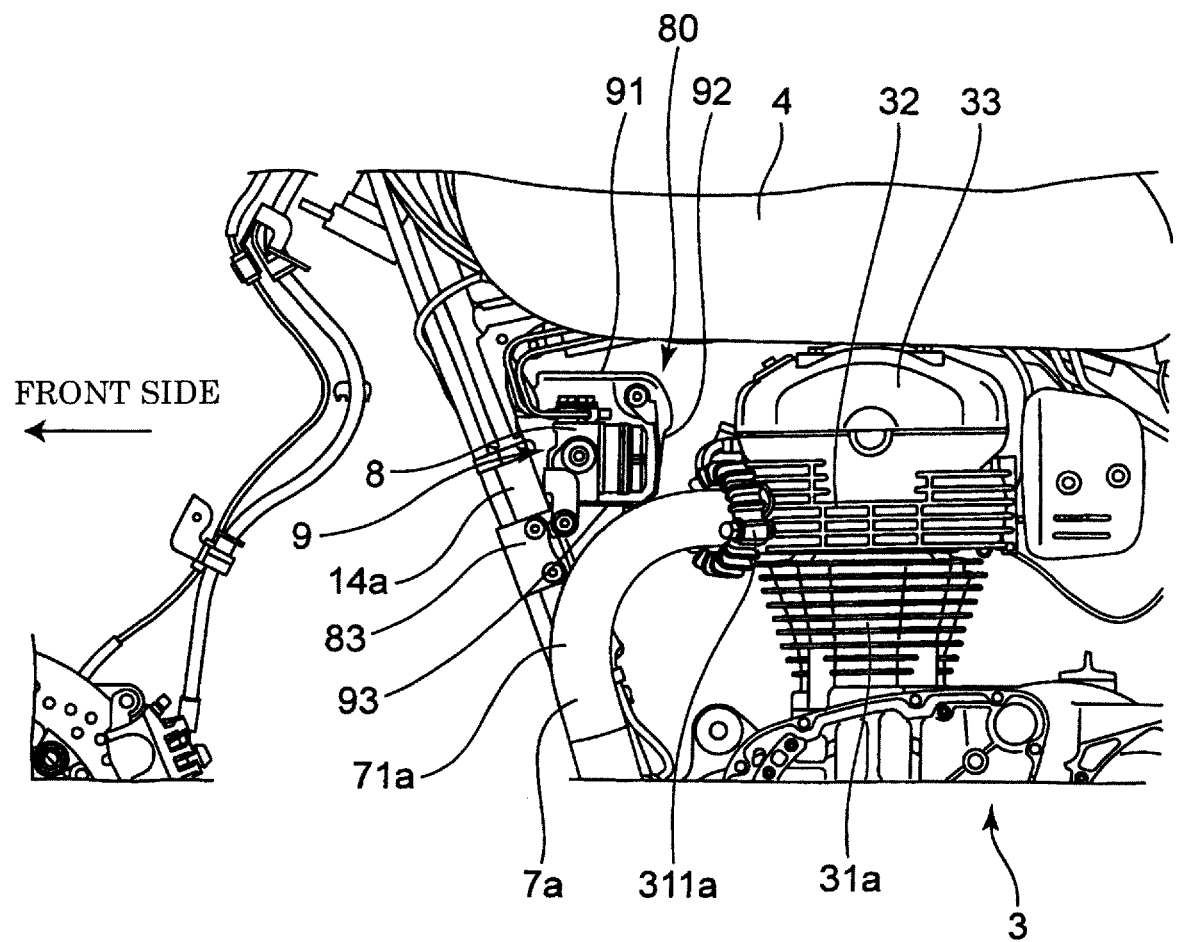
FIG. 7 is the enlarged left side view of a state in which a unit cover is removed.

FIG. 4 is an enlarged front perspective view around the ABS unit, FIG. 5 is an enlarged rear view around the ABS unit, and FIG. 6 is an enlarged left side view around the ABS unit. As shown in FIGS. 4 to 6, the ABS unit 8 is covered by a unit cover 9. FIG. 7 is the enlarged left side view of a state in which a unit cover 9 is removed. The unit cover 9 is provided so as to prevent the hot air from the engine 3 and the exhaust pipe 7 from reaching the ABS unit 8, and includes an upper wall 91, a rear wall 92, a lower wall 93 and side walls 94. The upper wall 91 covers an upper surface of the ABS unit 8, and the rear wall 92 partitions the cylinder head 32 and a rear surface of the ABS unit 8 from each other in a front-rear direction. The lower wall 93 partitions the exhaust pipe 7 and the lower surface of the ABS unit 8 from each other in a vertical direction. The side walls 94 are provided as a pair and cover both side surfaces of the ABS unit 8 in the vehicle width direction.

The upper wall 91, the rear wall 92 and the lower wall 93 are integrally formed of metal. On the other hand, the side walls 94 are formed separately as left and right pieces, and are respectively formed of resin. The unit cover 9 is formed smaller than the fuel tank 4 regarding a dimension in the vehicle width direction, and is also formed smaller than the engine 3 and the exhaust pipe 7 regarding dimensions in the vehicle width direction. As a result, even when the motorcycle 10 collides with an obstacle or the like, the ABS unit 8 can be protected by the fuel tank 4 and the like. In addition, when viewed from above, the unit cover 9 is easily partially hidden by the fuel tank 4, and accordingly, aesthetic appearance can be prevented from being impaired.

In the unit cover 9, there are formed an upper gap 9a communicating an internal space 90 in which the ABS unit 8 is arranged and an external space thereabove with each other, and a lower gap 9b arranged below the upper gap 9a and communicating the internal space 90 and an external space with each other. The upper gap 9a extends in a left-right direction, and piping extending from the ABS unit 8 toward the brake caliper of the front wheel 1 passes through one of left and right sides (right side in the present embodiment) of the upper gap 9a, and piping extending toward the brake caliper of the rear wheel 2 from the ABS unit 8 passes through the other of left and right sides (left side in the present embodiment) of the upper gap 9a. The piping is arranged above the unit cover 9 and behind the down frames 14 so as to be protected by the down frames 14.

The support member 83 supporting the ABS unit 8 on the down frames 14 includes a support part 831 that supports another electrical component. In the present embodiment, the other electrical component is a grip heater controller 85. The grip heater controller 85 controls a heater attached to a grip of a handle. The grip heater controller 85 is arranged between the pair of left and right down frames 14a and 14b in the side view of the vehicle body.

Figure 8:
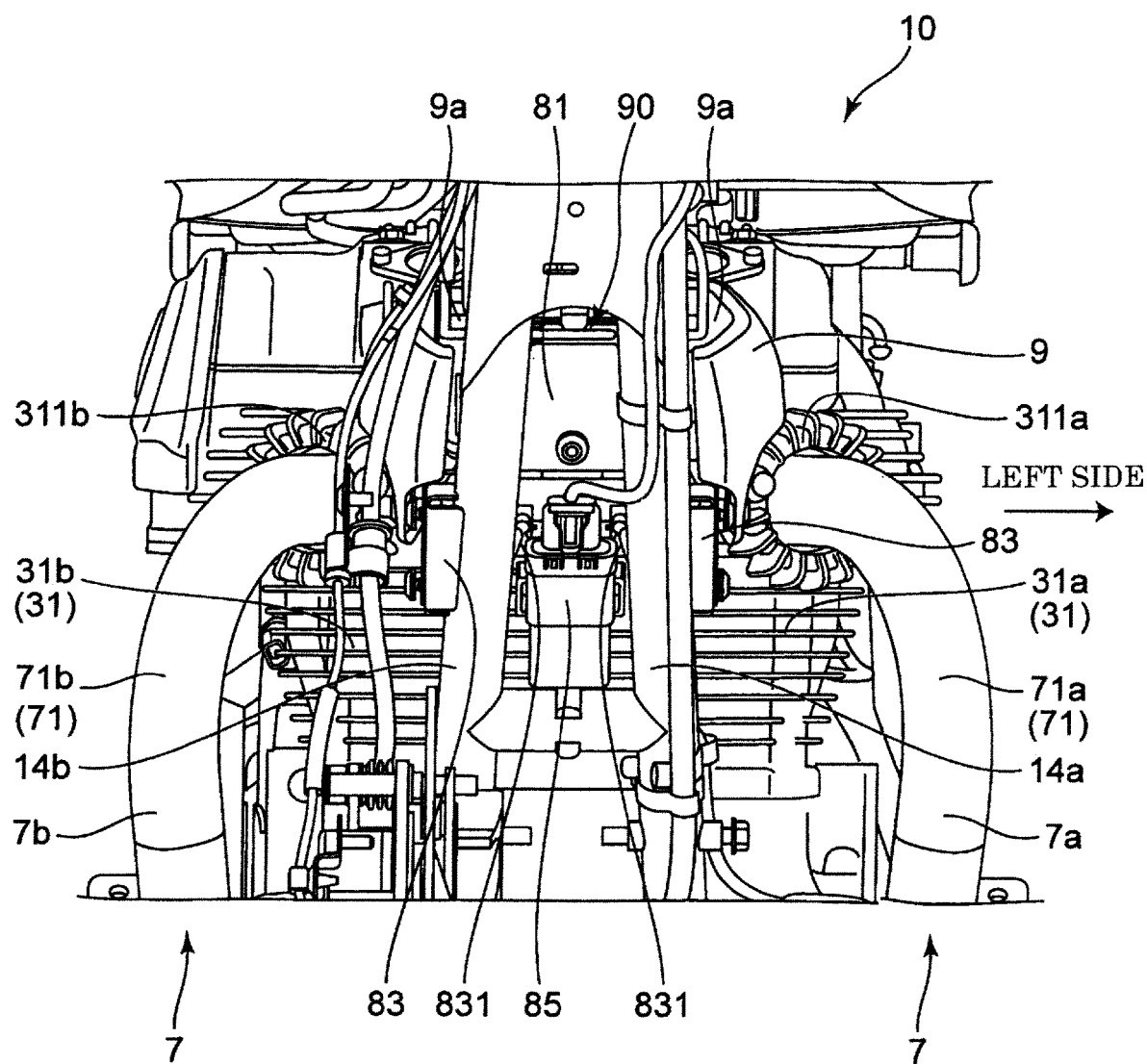
FIG. 8 is an enlarged front view of a state in which an electrical component cover is removed.

As shown in FIG. 3, a front surface of the grip heater controller 85 is covered with an electrical component cover 87 in the front view, and the electrical component cover 87 extends between the pair of left and right down frames 14. FIG. 8 is an enlarged front view of a state in which the electrical component cover 87 is removed. The electrical component cover 87 has an asymmetrical shape, is attached to the front wall member, is supported by the left down frame 14a by a clamp, and is not supported by the right down frame 14b. That is, the electrical component cover 87 is formed such that a structure on a right side is simplified as compared to a structure on a left side. Therefore, when the motorcycle 10 is supported by a side stand, the structure of the right side that is easily noticeable from the outside of the motorcycle 10 is simplified, so the appearance of the motorcycle 10 during a stop is improved.

According to the motorcycle 10 configured as described above, the following effects can be exhibited.

(1) The ABS unit 8 is arranged in the engine front space 80 formed above the exhaust pipe 7. In this manner, the ABS unit 8 can be arranged using a space prepared for connecting the exhaust pipe 7, and accordingly, the installation space of the ABS unit 8 can be easily secured with the limited arrangement space.

(2) The unit cover 9 is provided to prevent the hot air from the engine 3 and the exhaust pipe 7 from reaching the ABS unit 8, allowing the unit cover 9 to suppress the influence of the exhaust heat of the engine 3 on the ABS unit 8. This can prevent the temperature rise of the ABS unit 8, and the ABS unit 8 can be arranged close to the engine 3 and the exhaust pipe 7, and accordingly, the installation space can be secured more easily.

(3) An air layer can be formed between the cylinder head 32 and the exhaust pipe 7, and the ABS unit 8 by the rear wall 92, the lower wall 93 and the side walls 94 of the unit cover 9. Accordingly, the temperature rise of the ambient environment of the ABS unit 8 due to the exhaust heat can be further prevented, and the ABS unit 8 can be arranged close to the engine 3 and the exhaust pipe 7, and accordingly, the installation space can be secured more easily.

(4) Because the upper gap 9a and the lower gap 9b are formed in the unit cover 9, the air between the ABS unit 8 and the unit cover 9 can more easily form a flow that flows upward due to the upper gap 9a and the lower gap 9b. This allows the hot air in the internal space 90 of the unit cover 9 can be discharged, and accordingly, the temperature rise of the ABS unit 8 can be further suppressed.

(5) The exhaust pipe 7 is formed with the widened part 70 directed outward in the vehicle width direction as the exhaust pipe 7 runs forward from the exhaust port 311. As a result, the exhaust pipe 7 is separated outward in the vehicle width direction with respect to the ABS unit 8 arranged in front of the exhaust port 311. Accordingly, the influence of the hot air of the exhaust pipe 7 on the ABS unit 8 can be suppressed.

(6) In the front view of the vehicle body, the ABS unit 8 is arranged at the position shifted in the vehicle width direction with respect to the exhaust pipe 7. As a result, the exhaust pipe 7 and the ABS unit 8 can be easily shifted from each other in the vehicle width direction, and the influence of the exhaust heat of the exhaust pipe 7 on the ABS unit 8 can be suppressed.

(7) Because the engine 3 and the exhaust pipe 7 are entirely exposed in the side view, the influence of the exhaust heat on the ABS unit 8 can be further suppressed without the exhaust heat being stagnant.

(8) The ABS unit 8 is arranged below the fuel tank 4 and behind the down frames 14. As a result, the ABS unit 8 is arranged in a region surrounded by the cylinder head 32, the fuel tank 4, the down frames 14, and the exhaust pipe 7. Accordingly, the ABS unit 8 is surrounded by the members with relatively high rigidity over the front, rear, upper, and lower sides, and the protective effect of the ABS unit 8 can be enhanced.

(9) In the front view of the vehicle body, the down frames 14 are provided with the front wall member 81 that covers at least a part of the front surface of the ABS unit 8. As a result, scattered matters from the front can be prevented from colliding with the ABS unit 8 and the cable connection part of the ABS unit 8, and accordingly, the protective effect of the ABS unit 8 can be enhanced.

(10) The support member 83 that supports the ABS unit 8 on the down frames 14 includes the support part 831 supporting the grip heater controller 85. As a result, the ABS unit 8 and the support member 83 of the grip heater controller 85 can be made common, and accordingly, the number of components can be reduced. Further, the grip heater controller 85 can be expected to have a protective effect provided by the down frames 14 by being arranged between the pair of down frames 14a and 14b in the side view.

(11) Because the moving direction of the piston of the engine 3 is substantially vertical, the space can be easily secured between the front end part of the fuel tank 4 and the front surface of the engine 3 in the front-rear direction, and the ABS unit 8 can be arranged in the space.

(12) Because the exhaust pipe 7 is arranged outward in the vehicle width direction of the down frames 14, the space can be easily secured between the exhaust pipe 7 and the ABS unit 8.

(13) In the side view of the motorcycle 10, the engine 3 is exposed, so that the motorcycle can have a structure in which the exhaust heat of the engine 3 does not easily stagnate.

(14) Because the grip heater controller 85 is arranged between the pair of left and right down frames 14, the grip heater controller 85 can be hidden by the down frames 14 in the side view, and accordingly, the aesthetic appearance of the motorcycle 10 can be improved.

(15) Because the side walls 94 of the unit cover 9 cover both side surfaces of the ABS unit 8 in the vehicle width direction, the ABS unit 8 can be hidden by the unit cover 9 in the side view, and accordingly, the aesthetic appearance of the motorcycle 10 can be improved.

(16) Because the exhaust pipe 7 extends from the front to the rear below the engine 3, the influence of heat from the engine 3 to the exhaust pipe 7 can be suppressed.

(17) The lower gap 9b has a front opening 9b1 that opens forward and a lower opening 9b2 that opens downward. Note that by forming the front opening 9b1, the traveling air can be easily taken into the internal space 90, and by forming the lower opening 9b2, the air flow directed from a bottom part of the ABS unit 8 arranged in the internal space 90 toward an upper part thereof can be easily formed.

(18) The piping extending from the ABS unit 8 toward the brake caliper of the front wheel 1 passes through one of the left and right sides (right side in the present embodiment) of the upper gap 9a, and the piping extending from the ABS unit 8 toward the brake caliper of the rear wheel 2 passes through the other of the left and right sides (left side in this embodiment) of the upper gap 9a. As described above, by arranging the piping directed to the front wheel 1 and the piping directed to the rear wheel 2 separately on the left and right sides, installation tolerance of the piping can be improved.

(19) Because the upper wall 91, the rear wall 92, and the lower wall 93 of the unit cover 9 are formed of metal, heat shielding properties of the unit cover 9 can be improved, and accordingly, the ABS unit 8 inside the unit cover 9 can be protected from radiant heat of the engine 3. In addition, the upper wall 91, the rear wall 92, and the lower wall 93 made of metal can reduce electromagnetic noise that adversely affects the ABS unit 8.

(20) Because the side walls 94 of the unit cover 9 is formed of resin, a shape with high designability can be easily formed, and the designability of the motorcycle 10 can be improved in the side view. Note that because the side walls 94 hardly receive the radiant heat from the engine 3 directly, there is no need to use metal having high heat resistance.

(21) Because the side surfaces of the engine 3 in the vehicle width direction are exposed outward in the vehicle width direction, heat exchange is promoted, and accordingly, the temperature rise of the ABS unit 8 can be suitably suppressed.

(22) By applying the present invention to the motorcycle 10 equipped with an air-cooled engine not provided with a radiator, the radiator, a radiator cover, and a wind guide member that guides the traveling air to the radiator can be omitted. Accordingly, the heat exchange in the upper space of the exhaust pipe 7 can be promoted. As a result, the temperature rise of the ABS unit 8 can be suitably suppressed.

(23) By arranging the ABS unit 8 between the front wheel 1 and the engine 3, the ABS unit 8 is arranged at the position relatively close to the front wheel 1. As a result, a time delay of brake pressure change with respect to the front wheel 1 can be suppressed, and accordingly, responsiveness to braking of the front wheel 1 can be improved.

In the above embodiment, the engine 3 is a two-cylinder engine, however, the engine 3 may be a multi-cylinder engine having three or more cylinders or a single-cylinder engine. Also, the moving direction of the piston may be formed to be inclined forward as the piston goes upward. Thus, a dimension between the fuel tank 4 and the cylinder head 32 in the vertical direction can be easily increased, and the temperature rise of the ABS unit 8 can be further suppressed. Additionally, in the case of having one exhaust pipe, the ABS unit 8 is not provided at a position overlapping with the exhaust pipe in the front view.

In the above embodiment, the ABS unit 8 is attached to the down frames 14 of the vehicle body frame 11, but the pair of left and right down frames may not be provided. For example, the present invention can also be applied to a straddle-type vehicle with one down frame or with no down frame. For example, the present invention can be applied to vehicles of various frame structures such as a cradle type, a diamond frame type, a backbone type, a truss structure type, and a twin spar type. In the case of a vehicle body frame having no down frame, the ABS unit 8 may be attached to a front frame located at a front end of the vehicle body frame, such as a head pipe.

In the above embodiment, the ABS unit 8 has been described as an example of the control unit that controls the operation of the motorcycle. Further, although the ABS unit 8 is configured to adjust the brake pressure of the front and rear wheels, the present invention also includes the case of adjusting the brake pressure of one of the front wheel and the rear wheel. Further, the control unit is not limited to the ABS unit, and may be any control unit that controls the operation of the motorcycle, and can be applied to an engine ECU, a suspension ECU, and the like. Note that the brake control unit that controls the braking operation or the engine control unit that controls generated driving force is prone to be enlarged relatively, and has a large effect by being arranged in the engine front space near the front wheel.

In the above embodiment, the grip heater controller 85 has been described as an example of the other electrical component, but the other electrical component is not limited to the grip heater controller, and can be applied to, for example, a relay, a regulator, a canister, and the like.

In the above embodiment, a particularly large effect can be obtained by the arrangement structure of the control unit of the motorcycle provided with the air-cooled engine. Specifically, the control unit can be arranged by effectively utilizing the arrangement space of the radiator. The present invention can also be applied to a motorcycle provided with a water-cooled engine.

In the above embodiment, although the motorcycle 10 is the naked type without the cowl, the present invention is applicable to all straddle-type vehicles in which an exhaust pipe is connected in front of a cylinder, and can be applied to motorcycles with a cowl such as a half cowl having only an upper cowl, a bikini cowl with a cowl at a handle, a full cowl covering the entire front part with a cowl, or the like. In addition, the present invention can be applied to a cruiser type (American type) motorcycle used for long distance touring.

In the above embodiment, a motorcycle has been described as an example of the straddle-type vehicle, but the straddle-type vehicle is not limited to the motorcycle, and includes all vehicles that are ridden by straddling over a vehicle body. The present invention can be applied not only to motorcycles but also to three or four-wheeled vehicles.

The present invention is not limited to the configuration described in the above embodiment, and can include various modifications that can be conceived by those skilled in the art without departing from the contents described in the claims.

What is claimed is:

1. A straddle vehicle, comprising:
   a driver seat on which a driver rides;
   a cylinder head of an engine arranged in a region in front of and below the driver seat;
   an exhaust pipe that is connected to an exhaust port formed on a front surface of the cylinder head, and exhausts exhaust of the engine;
   a control unit that is arranged in an engine front space formed in front of the cylinder head, above the exhaust pipe, and below an upper end surface of the engine, and controls the straddle vehicle; and
   a unit cover that prevents hot air from the engine and the exhaust pipe from reaching the control unit.

2. The straddle vehicle according to claim 1, wherein the unit cover includes a rear wall that partitions the cylinder head and a rear surface of the control unit from each other in a front-rear direction, a lower wall that partitions the exhaust pipe and a lower surface of the control unit from each other in a vertical direction, and a pair of side walls that respectively cover both side surfaces in a vehicle width direction of the control unit.

3. The straddle vehicle according to claim 1, wherein the unit cover is provided with an upper gap communicating an internal space in which the control unit is arranged and an external space arranged above the internal space with each other, and a lower gap arranged below the upper gap and communicating the internal space and an external space with each other.

4. The straddle vehicle according to claim 1, wherein the exhaust pipe is provided with a widened part directed outward in the vehicle width direction as the exhaust pipe runs forward from the exhaust port.

5. The straddle vehicle according to claim 1, wherein, in a front view of a vehicle body, the control unit is arranged at a position shifted in the vehicle width direction with respect to the exhaust pipe.

6. The straddle vehicle according to claim 1, wherein the engine and the exhaust pipe are entirely exposed in a side view.

7. The straddle vehicle according to claim 1, further comprising:
   a fuel tank arranged in front of and above the driver seat; and
   a vehicle body frame having a head pipe supporting a handle, and down frames connected to the head pipe and extending downward from the fuel tank, wherein the control unit is arranged below the fuel tank and behind the down frames.

8. A straddle vehicle, comprising:
   a driver seat on which a driver rides;
   a cylinder head of an engine arranged in a region in front of and below the driver seat;
   an exhaust pipe that is connected to an exhaust port formed on a front surface of the cylinder head, and exhausts exhaust of the engine;
   a control unit that is arranged in an engine front space formed in front of the cylinder head, above the exhaust pipe, and below an upper end surface of the engine, and controls the straddle vehicle,
   a fuel tank arranged in front of and above the driver seat; and a vehicle body frame having a head pipe supporting a handle, and down frames connected to the head pipe and extending downward from the fuel tank, wherein the control unit is arranged below the fuel tank and behind the down frames, and wherein, in the front view of the vehicle body, the down frames are provided with a front wall member that covers at least a part of a front surface of the control unit.

9. The straddle vehicle according to claim 8, wherein the down frames extend downward as a pair with a space provided in the vehicle width direction, the front wall member connects the down frames in the vehicle width direction and supports the control unit, and a support member that supports the control unit on the down frames includes a support part that supports another electrical component arranged between the pair of down frames.

10. A straddle vehicle, comprising:

a driver seat on which a driver rides;

a fuel tank arranged in front of and above the driver seat;

a cylinder head of an engine arranged in a region in front of the driver seat and below the fuel tank;

an exhaust pipe that is connected to an exhaust port formed on a front surface of the cylinder head;

a control unit that is arranged in an engine front space formed in front of the cylinder head, behind a front end of the fuel tank, above a lower surface of the cylinder head, and below a lower surface of the fuel tank, and controls the straddle vehicle; and a unit cover that prevents hot air from the engine and the exhaust pipe from reaching the control unit.

\* \* \* \* \*